US009807348B2

(12) United States Patent
Higashiura et al.

(10) Patent No.: US 9,807,348 B2
(45) Date of Patent: Oct. 31, 2017

(54) IMAGING APPARATUS, IMAGING METHOD, AND IMAGING PROGRAM

(71) Applicant: FUJITSU FRONTECH LIMITED, Inagi-shi, Tokyo (JP)

(72) Inventors: Yasuyuki Higashiura, Inagi (JP); Hideo Kamata, Inagi (JP); Akitaka Minagawa, Inagi (JP); Kentarou Kasugai, Inagi (JP); Katsumi Ide, Inagi (JP); Yasuhiro Morimoto, Inagi (JP); Masahiro Kobayashi, Maebashi (JP); Yoshikazu Kosaka, Maebashi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 355 days.

(21) Appl. No.: 13/974,897

(22) Filed: Aug. 23, 2013

(65) Prior Publication Data
US 2013/0335560 A1 Dec. 19, 2013

Related U.S. Application Data

(63) Continuation of application No. PCT/JP2011/056031, filed on Mar. 15, 2011.

(51) Int. Cl.
*H04N 7/18* (2006.01)
*G01S 17/08* (2006.01)
(Continued)

(52) U.S. Cl.
CPC .............. *H04N 7/18* (2013.01); *G01S 17/08* (2013.01); *G01S 17/89* (2013.01);
(Continued)

(58) Field of Classification Search
CPC ......... H04N 7/18; G01S 17/08; G06T 7/0042; G06T 2207/20224; G06K 9/00013
(Continued)

(56) References Cited

U.S. PATENT DOCUMENTS

2006/0290781 A1  12/2006 Hama
2007/0013646 A1   1/2007 Harada
(Continued)

FOREIGN PATENT DOCUMENTS

CN    1888813 A    1/2007
CN  101030252 A    9/2007
(Continued)

OTHER PUBLICATIONS

Extended European Search Report dated Jul. 15, 2014, issued in corresponding European Patent Application (8 pages).
(Continued)

*Primary Examiner* — Andy Rao
*Assistant Examiner* — Zaihan Jiang
(74) *Attorney, Agent, or Firm* — Westerman, Hattori, Daniels & Adrian, LLP

(57) ABSTRACT

In the case where an imaging apparatus is not able to detect the distance to an object placed over an imaging surface thereof, if the area of a bright region in an image of the object captured by an imaging unit with light emitted from a light emitting unit is equal to or greater than a predetermined area, the imaging apparatus determines that the object is close to the imaging apparatus. Thus, it becomes possible to let the user know that the palm is too close to the imaging apparatus and to prompt the user to move the palm away from the imaging apparatus. Accordingly, it becomes possible to smoothly capture an image of the object.

6 Claims, 12 Drawing Sheets

(51) Int. Cl.
*G06K 9/00* (2006.01)
*G01S 17/89* (2006.01)
*G06T 7/73* (2017.01)
*G01S 17/06* (2006.01)

(52) U.S. Cl.
CPC ............ *G06K 9/00013* (2013.01); *G06T 7/73* (2017.01); *G01S 17/06* (2013.01); *G06T 2207/10004* (2013.01); *G06T 2207/10152* (2013.01); *G06T 2207/20224* (2013.01)

(58) Field of Classification Search
USPC ........................................................ 348/140
See application file for complete search history.

(56) References Cited

U.S. PATENT DOCUMENTS

| | | |
|---|---|---|
| 2007/0206099 A1 | 9/2007 | Matsuo et al. |
| 2008/0186475 A1 | 8/2008 | Kawata et al. |
| 2010/0103151 A1 | 4/2010 | Harada |
| 2010/0110031 A1* | 5/2010 | Miyazawa ............ G06F 3/0488 345/173 |
| 2010/0194713 A1* | 8/2010 | Kawashima ............ G06F 3/042 345/175 |
| 2010/0245289 A1* | 9/2010 | Svajda .................. G06F 3/0421 345/175 |
| 2011/0150304 A1* | 6/2011 | Abe ...................... A61B 5/1172 382/124 |
| 2011/0274318 A1 | 11/2011 | Shindo et al. |
| 2012/0247308 A1* | 10/2012 | Tsai ...................... G06F 3/0421 84/658 |

FOREIGN PATENT DOCUMENTS

| | | |
|---|---|---|
| EP | 1 739 391 A2 | 1/2007 |
| EP | 1744241 A1 | 1/2007 |
| EP | 1 830 306 A2 | 9/2007 |
| JP | 60-135712 U | 9/1985 |
| JP | 11-94542 A | 4/1999 |
| JP | 11-094542 A | 4/1999 |
| JP | 2002-150440 A | 5/2002 |
| JP | 2002-232779 A | 8/2002 |
| JP | 2003-323621 A | 11/2003 |
| JP | 2006-243189 A | 9/2006 |
| JP | 2007-010346 A | 1/2007 |
| JP | 2007-025796 A | 2/2007 |
| JP | 3930621 B2 | 6/2007 |
| JP | 2007-229360 A | 9/2007 |
| JP | 2008-128815 A | 6/2008 |
| JP | 2008-168118 A | 7/2008 |
| JP | 2009-148485 A | 7/2009 |
| JP | 2010-107722 A | 5/2010 |
| WO | 2010/086993 A1 | 8/2010 |

OTHER PUBLICATIONS

International Search Report of PCT/JP2011/056031, dated May 17, 2011.

Japanese Office Action dated Jan. 6, 2015, issued in corresponding JP Patent Application No. 2013-504443 with English partial translation (8 pages).

Office Action dated Dec. 24, 2015, issued in counterpart Chinese Application No. 201180069191.1, with English translation (15 pages).

* cited by examiner

IMAGING APPARATUS, IMAGING METHOD, AND IMAGING PROGRAM

CROSS-REFERENCE TO RELATED APPLICATION

This application is a continuation application of International Application PCT/JP2011/056031 filed on Mar. 15, 2011 which designated the U.S., the entire contents of which are incorporated herein by reference.

FIELD

The present invention relates to an imaging apparatus, an imaging method, and an imaging program.

BACKGROUND

There are imaging apparatuses for biometric authentication that, for example, capture an image of palm veins without any physical contact with the palm, and read the palm vein image. Such an imaging apparatus is able to capture an image properly when the object is placed in a predetermined distance range from the imaging camera of the imaging apparatus. Therefore, the imaging apparatus needs to detect the distance to the object.

Thus, there has been disclosed a method for detecting the distance or the like from an imaging camera to an object. This method captures an image of an object with a spotlight projected thereon, and detects the distance from the imaging camera to the object on the basis of the spotlight in the captured image, for example (see, for example, Japanese Laid-open Patent Publication No. 2007-10346).

However, with this method of detecting the distance from an imaging apparatus to an object, in the case where the object is placed close to the imaging apparatus, spotlight projected on the object falls out of the imaging area of the imaging camera, so that the spotlight does not appear in the captured image. When the spotlight does not appear in the captured image, it is not possible to detect the distance from the imaging apparatus to the object. Thus, it is not possible to determine whether the object is close to the imaging apparatus or the object is not present.

SUMMARY

According to an aspect of the embodiments to be discussed herein, there is provided an imaging apparatus which includes an imaging unit configured to capture an image of an object; a first light emitting unit configured to, upon measurement of a distance to the object, emit light so as to illuminate a side of the object to be imaged by the imaging unit; a second light emitting unit configured to, upon capture of an image of the object, emit light so as to illuminate the side of the object to be imaged by the imaging unit; and a processor configured to perform a procedure including: measuring a distance to the object with light from the first light emitting unit, and determining whether the object is close to the imaging unit or not, on the basis of a bright region in an image of the object that is captured by the imaging unit with light from the second light emitting unit, when the measurement of the distance to the object fails.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of the present invention will be explained below with reference to the accompanying drawings.

First Embodiment

Figure 1A:
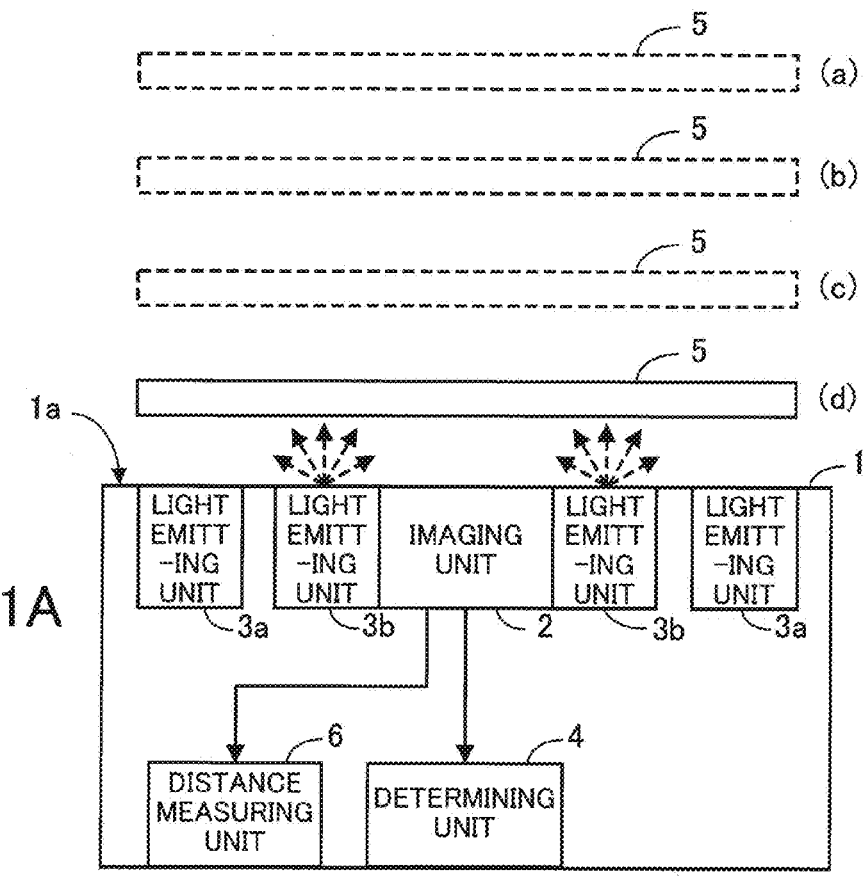
FIGS. 1A and 1B are a conceptual diagram illustrating an imaging apparatus according to a first embodiment.
Figure 1B:
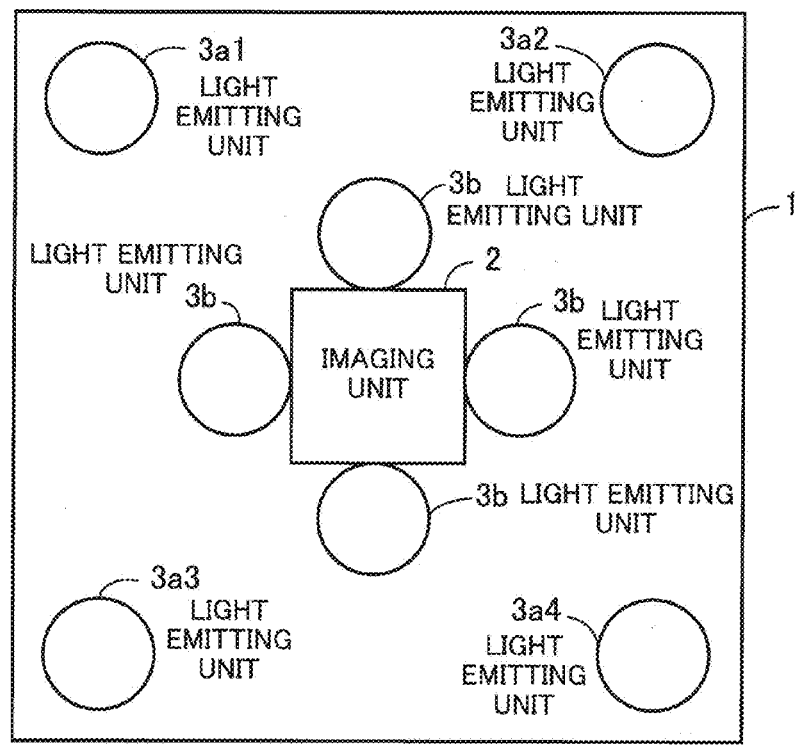

FIGS. 1A and 1B are a conceptual diagram illustrating an imaging apparatus according to a first embodiment.

More specifically, FIG. 1A is a side view of an imaging apparatus 1 that captures an image of an object 5 placed at any of heights (a) through (d), and FIG. 1B is a top plan view of the imaging apparatus 1.

The imaging apparatus 1 is capable of determining whether the object 5 is placed in the vicinity of an imaging surface 1a of the imaging apparatus 1.

As illustrated in FIGS. 1A and 1B, this imaging apparatus 1 includes an imaging unit 2, light emitting units 3a and 3b, and a determining unit 4.

The imaging unit 2 captures an image of the object 5. The imaging unit 2 includes, for example, an imaging camera 2a and an optical system 2b as will be described with reference to FIG. 3A, and captures an image of the object 5 using the imaging camera 2a.

Each light emitting unit 3a projects a spotlight, which is a focused light, onto the object 5, when a distance measuring unit 6 (described below) measures the distance from the imaging surface 1a of the imaging apparatus 1 to the object 5. The spotlight is projected parallel to the optical axis of the imaging camera 2a of the imaging unit 2. The imaging apparatus 1 is capable of measuring the distance from the imaging surface 1a to the object 5 by comparing the distance between the center of an image of the object 5 captured by the imaging unit 2 and the spotlight projected from the light emitting unit 3a with the distance between the center of the imaging unit 2 and the light emitting unit 3a. Note that the distance from the imaging surface 1a of the imaging apparatus 1 to the object 5 will be described later.

Each light emitting unit 3b emits light to illuminate a side of the object 5 to be imaged by the imaging unit 2. The light emitting unit 3b illuminates the object 5 when needed, and does not constantly illuminate the object 5.

The distance measuring unit 6 measures the distance to the object 5 using the light emitted from the light emitting units 3a.

The determining unit 4 determines that the object 5 is close to the imaging unit 2 on the basis of a bright region of an image of the object 5 that is captured by the imaging unit 2 with light emitted from the light emitting units 3b. The bright region is a region having a predetermined brightness level (luminance level) or higher. For example, the bright region is a group of pixels having a brightness level of 69 or higher in 256 brightness levels (luminance levels).

The following describes how the distance measuring unit 6 measures the distance from the imaging surface 1a of the imaging apparatus 1 to the object 5.

First, a description will be given of images of spotlights projected from the light emitting units 3a, which are captured while varying the height of the object with respect to the imaging surface 1a.

Figure 2A:
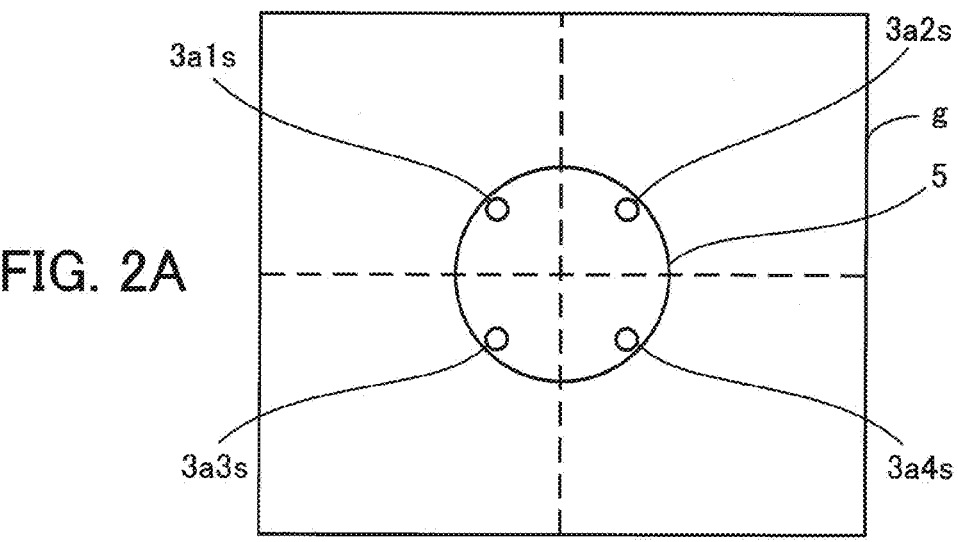
FIGS. 2A to 2C illustrate exemplary images that are captured while varying the distance from an object to the imaging apparatus.
Figure 2B:
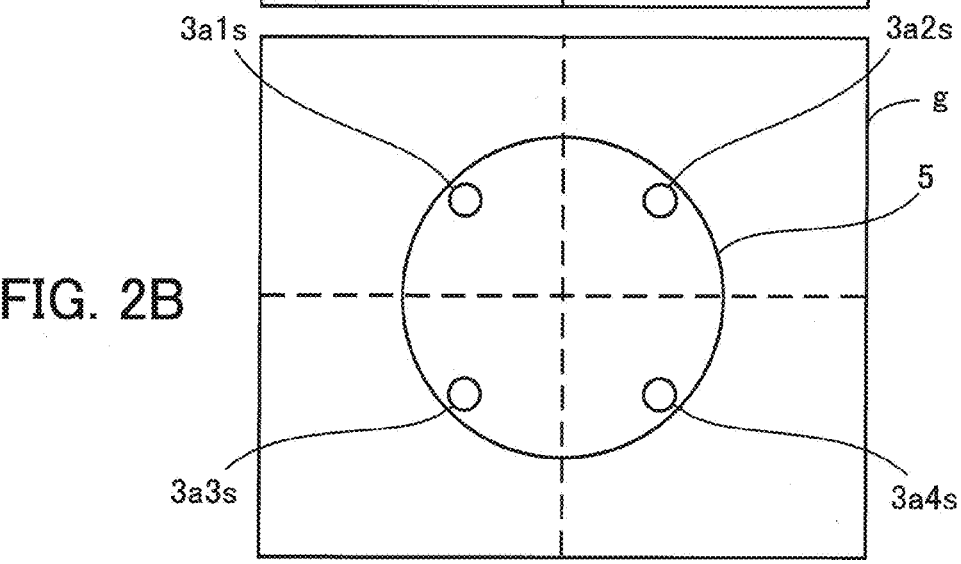
Figure 2C:
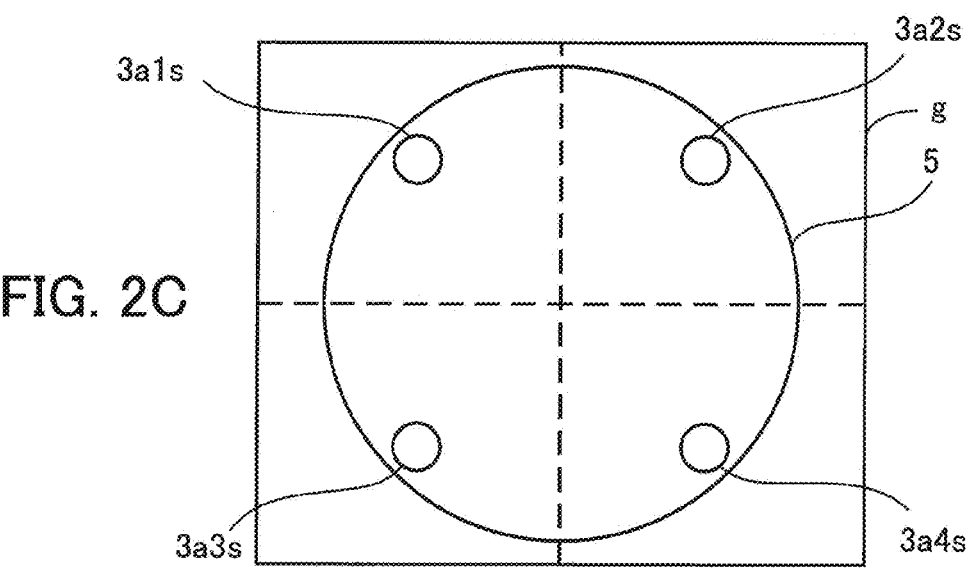

FIGS. 2A to 2C illustrate exemplary images that are captured while varying the distance from the object to the imaging apparatus.

More specifically, FIGS. 2A through 2C illustrate captured images g of the objects 5 located at distances (a) through (c), respectively, of FIG. 1A.

Referring first to FIG. 2A illustrating the captured image g of the object 5 located at the distance (a) of FIG. 1A, spotlights 3a1s through 3a4s projected from the light emitting units 3a1 through 3a4 onto the object 5 appear together with the object 5 at the center.

Referring then to FIGS. 2B and 2C illustrating the captured images g of the distances (b) and (c), as the object 5 is moved to the distance (b) and then to the distance (c) of FIG. 1A along the optical axis of the imaging camera 2a of the imaging unit 2, the object 5 is enlarged, and the spotlights 3a1s through 3a4s are shifted outward and away from each other.

Next, a description will be given of how the distance measuring unit 6 detects the distance from the object 5 to the imaging surface 1a of the imaging apparatus 1 using the spotlights 3a1s through 3a4s in such a captured image g.

Figure 3A:
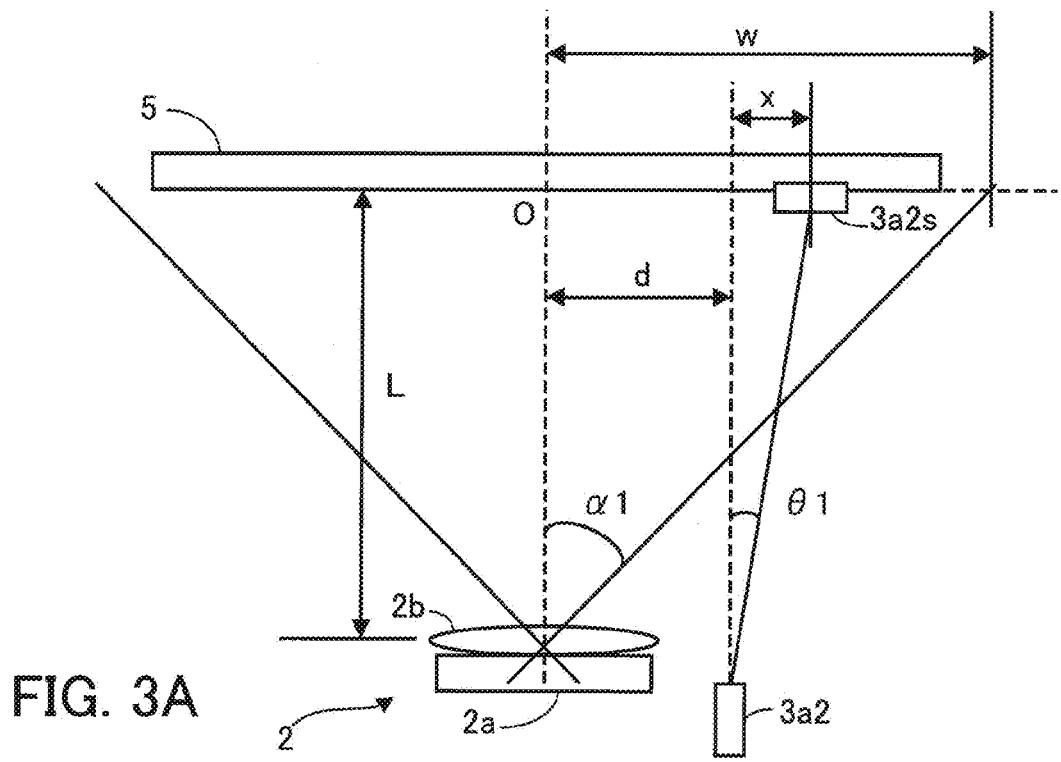
FIGS. 3A and 3B illustrate detection of the distance from the imaging apparatus to the object.
Figure 3B:
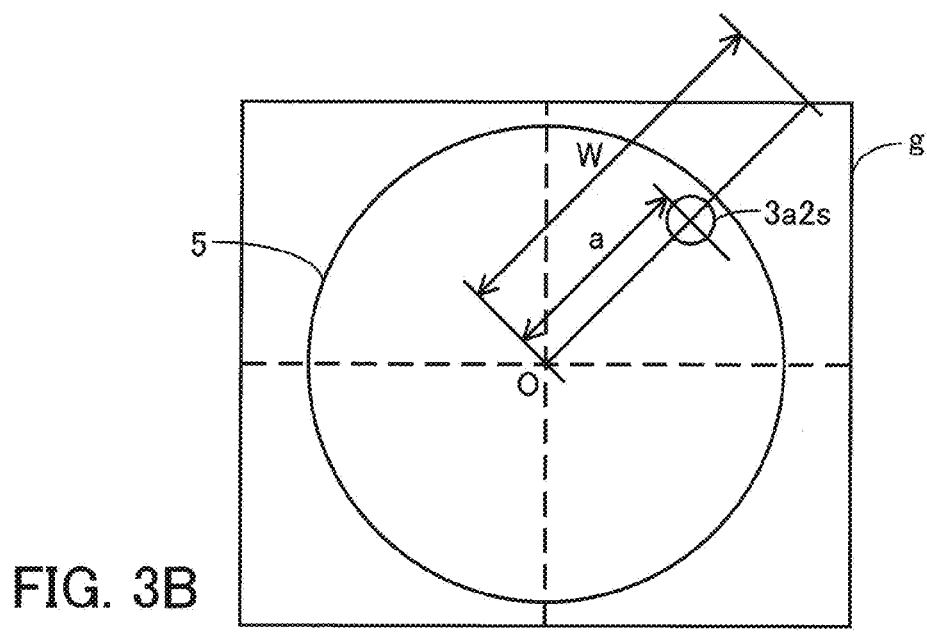

FIGS. 3A and 3B illustrate detection of the distance from the imaging apparatus to the object.

More specifically, FIG. 3A is a side view of the imaging camera 2a and the optical system 2b of the imaging unit 2 and the object 5, and FIG. 3B illustrates a captured image g of the object 5. In FIGS. 3A and 3B, only the light emitting unit 3a2 and the spotlight 3a2s projected from the light emitting unit 3a2 are illustrated.

As mentioned above, the imaging unit 2 captures an image g of the object 5 onto which the spotlight 3a2s is projected from the light emitting unit 3a2.

As illustrated in FIG. 3A, when the distance from the imaging unit 2 to the object 5 is L, the imaging range from a position O where the optical axis of the imaging unit 2 and the object 5 intersect at right angle is w; the distance from the imaging unit 2 to the light emitting unit 3a2 is d; and the position O to the position of the spotlight 3a2s on the object 5 is d+x. Note that x is the displacement due to deviation θ1 of the optical axis of the spotlight from the light emitting unit 3a2.

Further, as illustrated in FIG. 3B, in the captured image g captured by the imaging unit 2, the distance from the center (position O) of the object 5 to the spotlight 3a2s is a, and the imaging range in a moving direction of the spotlight 3a2s is W.

Then, the following proportional relationship holds:

$$(a/W) = \{(d+x)/w\} \tag{1}$$

Further, the imaging range w may be expressed with the half viewing angle α1 of the imaging unit 2 and the distance L, and the displacement x due to the optical axis deviation θ1 may be expressed with the distance L and the optical axis deviation θ1. Accordingly, Equation (1) may be expressed as the following Equation (2):

$$(a/W) = \{(d + L \tan \theta 1)/(L \tan \alpha 1)\} \tag{2}$$

On the basis of Equation (2), the distance L may be expressed as follows:

$$L = d/\{(a/W)^* \tan \alpha 1 - \tan \theta 1\} \tag{3}$$

$$\tan \theta 1 = (a/W)^* \tan \alpha 1 - d/L \tag{4}$$

In the case of calculating the optical axis deviation θ1, the spotlight distance a at the distance L, which is measured in advance by the imaging apparatus 1, is measured and substituted into Equation (4). Thus, tan θ1 may be calculated (calibrated). Note that this processing is performed for each of the light emitting units 3a1 through 3a4.

However, due to limitations in installation of the lens of the imaging camera 2a of the imaging unit 2 or other factors, it is sometimes difficult to accurately calculate the distance origin (that is, the starting point on the lens of the imaging camera 2a of the imaging unit 2 for obtaining the known distance L). In such a case, tan θ1 is calculated using two calibration measurement points.

That is, tan θ1 is calculated not simply on the basis of the distance L from the lens of the imaging camera 2a to the object 5, but on the basis of the distance (difference) between the two calibration measurement points.

Specifically, the object 5 is placed at each of the two calibration measurement points, the distance difference Δ between which is accurately calculated in advance. The imaging camera 2a captures an image g. Then, the distance L from the captured image g to the object 5 is calculated, and thus the optical axis deviation θ1 may be calibrated.

More specifically, a spotlight position a1' in an image captured at a calibration measurement point a1 for a known distance L is measured. Then, a spotlight position a2' in an image captured at a calibration measurement point a2, which is spaced apart from the calibration measurement point a1 by the distance A, is measured. These spotlight positions a1' and a2' are substituted into Equation (4), so that the following Equation (5) is obtained.

$$(a1'/W)^* \tan \alpha 1 - d/L = (a2'/W)^* \tan \alpha 1 - d/(L+\Delta) \tag{5}$$

On the basis of Equation (5), the distance L is expressed by the following equation:

$$\text{Distance } L = \{-\Delta + \text{squa}(\Delta^2 - 4k)\}/2 \tag{6}$$

In Equation (6), k is expressed by the following equation:

$$k = \Delta^* d/\{(a1' - a2')^* \tan \alpha 1/W\} \tag{7}$$

In this way, the distance L may be calculated by Equations (6) and (7) on the basis of the positions of the spotlights.

The following describes detection of a tilt of the object 5 on the basis of the distances L to the spotlights 3a1s through 3a4s.

Figure 4:
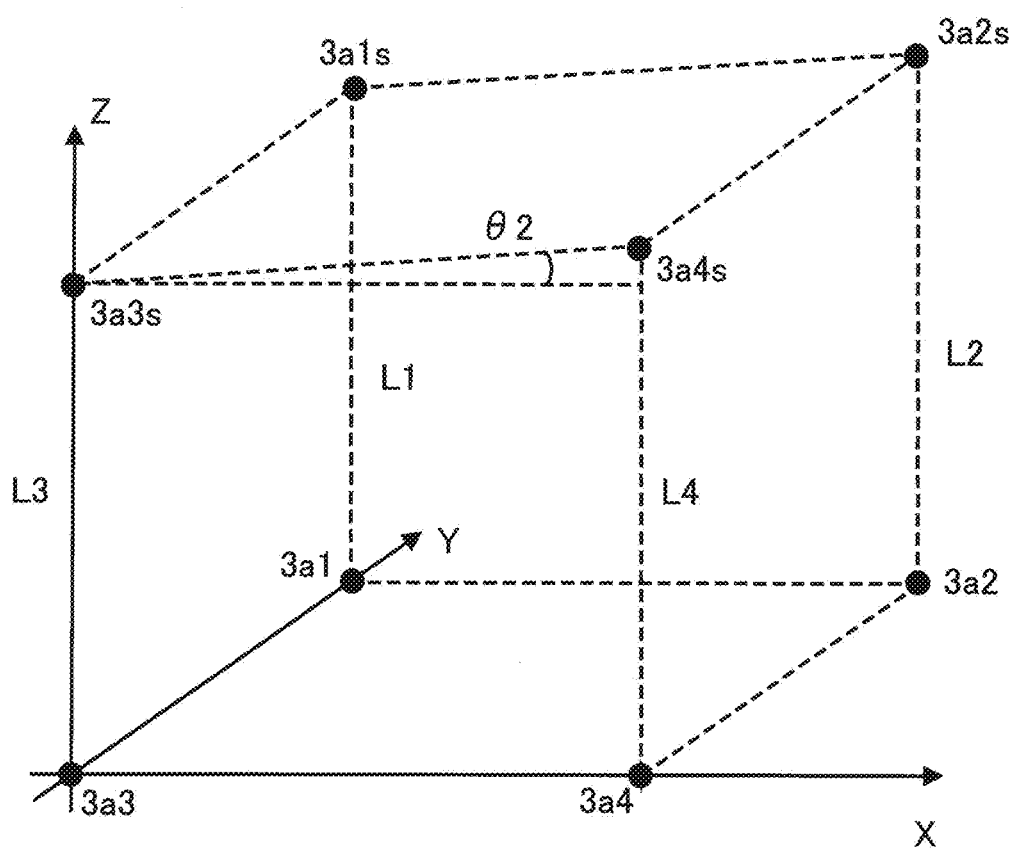
FIG. 4 illustrates detection of a tilt of the object with respect to the imaging apparatus.

FIG. 4 illustrates detection of a tilt of the object with respect to the imaging apparatus.

Note that, in FIG. 4, coordinates are defined such that the X direction indicates the transverse direction of the paper; the Z direction indicates the longitudinal direction of the paper; and the Y direction indicates the depth direction of the paper. In these coordinates, the positions of the light emitting units 3a1 through 3a4 and the spotlights 3a1s through 3a4s are indicated by dots. When the light emitting unit 3a3 is located at the origin, the light emitting unit 3a4 is located at (n,0,0); the light emitting unit 3a1 is located at (0,n,0); and the light emitting unit 3a2 is located at (n,n,0).

As described above, the distance measuring unit calculates distances L1 through L4 to the spotlights 3a1s through 3a4s, using the spotlights 3a1s through 3a4s projected from the light emitting units 3a1 through 3a4.

When the surface of the object 5 facing the imaging camera 2a of the imaging unit 2 is a plane or is generally a plane, the surface of the object 5 is expressed by the following equation using coefficients a, b, c, and d.

$$ax+by+cz+d=0 \quad (8)$$

The coefficients a, b, c, and d are calculated by substituting the coordinates of the positions of the spotlights 3a1s through 3a4s into Equation (8). The normal vector is determined by these coefficients, and thus information on the tilt and attitude of the object 5 is detected.

Further, as illustrated in FIG. 4, the plane may be divided by a line passing through the spotlights 3a4s and 3a1s so as to obtain two planes: one passing through the spotlights 3a4s, 3a3s, and 3a1s, and the other passing through the spotlights 3a2s, 3a4s, and 3a1s.

Then, for example, in the case of detecting a tilt of the object with respect to the Y direction, that is, in the case of detecting an angle θ2 in FIG. 4, the following equation may be used on the basis of Equation (8).

$$\tan \theta 2 = a/c \quad (9)$$

Further, the following equation may also be used.

$$\tan \theta 2 = (L4-L3)/n \quad (10)$$

In the first embodiment, the object 5 is placed in an appropriate imaging distance range (for example, 5 to 100 mm, corresponding to the positions (a) thorough (c) of FIG. 1A) from the imaging surface 1a of the imaging apparatus 1 in which the spotlights appear in the captured image g, and thus the spotlights appear in the captured image g. Therefore, the distance measuring unit 6 is able to calculate the distance L.

However, if the object 5 is moved from the distance (c) to the distance (d) of FIG. 1A along the optical axis of the imaging camera 2a of the imaging unit 2, the spotlight 3a2s is shifted outward to be out of the imaging range. Thus, the spotlight 3a2s does not appear in the captured image g.

In this way, if the object 5 approaches the imaging surface 1a of the imaging apparatus 1 so as to be located in an inappropriate imaging range (0 to 5 mm) in which spotlights do not appear in the captured image g, the distance measuring unit 6 is unable to calculate the distance L to the object 5, and thus is unable to determine whether or not the object 5 is present in the appropriate imaging distance range.

The following describes how the imaging apparatus 1 determines that the object 5 is close to the imaging apparatus 1 according to the first embodiment.

As illustrated in FIG. 1A, in the case where the object 5 (for example, the palm of the hand) is placed immediately above the imaging surface 1a so as to cover the imaging surface 1a of the imaging apparatus 1, and therefore the imaging apparatus 1 is not able to detect the distance from the imaging apparatus 1 to the object 5 using the light emitting unit 3a, the following operations are performed. Note that the reason for the distance from the imaging apparatus 1 to the object 5 being not detectable will be described in a second embodiment.

The imaging unit 2 captures an image of the object 5 with light emitted from the light emitting units 3b. In the case where the object 5 is placed in the inappropriate imaging distance range from the imaging apparatus 1, the intensity of light reflected from the object 5 is higher than that in the case where the object 5 is placed in the appropriate distance range. Accordingly, the thus captured image of the object 5 has a rate of the bright region higher than that of a captured image of the appropriate range, and therefore appears bright. On the other hand, in the case where the object 5 is not placed over the imaging surface of the imaging apparatus 1 or is spaced apart by a distance greater than an appropriate imaging distance, the captured image of the object 5 has a rate of the bright region lower than that of a captured image of the appropriate range, and therefore appears dark.

In this way, if the imaging apparatus 1 is not able to detect the distance to the object 5 located immediately above the imaging surface 1a, using the light emitting units 3a, the imaging unit 2 captures an image using light emitted from the light emitting units 3b. Thus, if the bright region has a higher rate in the captured image of the object 5, the object 5 is determined to be close to the imaging apparatus 1. If the dark region has a higher rate in the captured image, the object 5 is determined not to be placed over the imaging apparatus 1 or is determined to be spaced apart by a distance greater than an appropriate imaging distance.

Accordingly, since such determination is made, in the case where the object 5 is the palm of the hand of the user, it becomes possible to let the user know that the palm is too close to the imaging apparatus 1 and to prompt the user to move the palm away from the imaging apparatus 1 to a distance appropriate for imaging. Thus, it becomes possible to smoothly capture an image of the object 5.

Second Embodiment

In a second embodiment, the imaging apparatus of the first embodiment will be described in greater detail.

Figure 5:
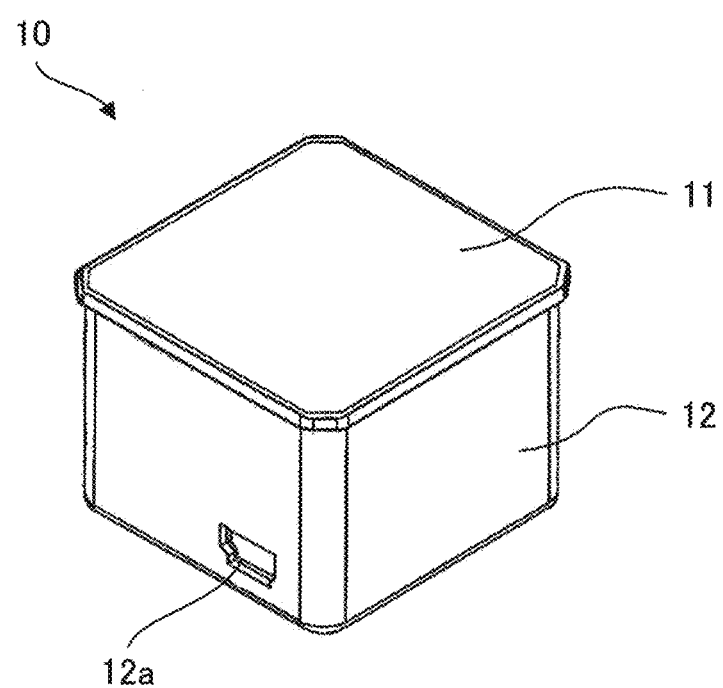
FIG. 5 is a perspective view illustrating an imaging apparatus according to a second embodiment.

FIG. 5 is a perspective view illustrating an imaging apparatus according to the second embodiment.

An imaging apparatus 10 illustrated in FIG. 5 is covered at the top with a filter 11 over which the palm is placed, and is covered at the sides with an exterior case 12. The exterior case 12 has an external connection port 12a to which a cable or the like is connected for connection to an external device. The imaging apparatus 10 is connected to a personal computer (PC) or is embedded in an automatic teller machine in a financial institution or the like, for example, and is used for user authentication.

Next, the internal structure covered with the filter 11 and the exterior case 12 will be described.

Figure 6A:
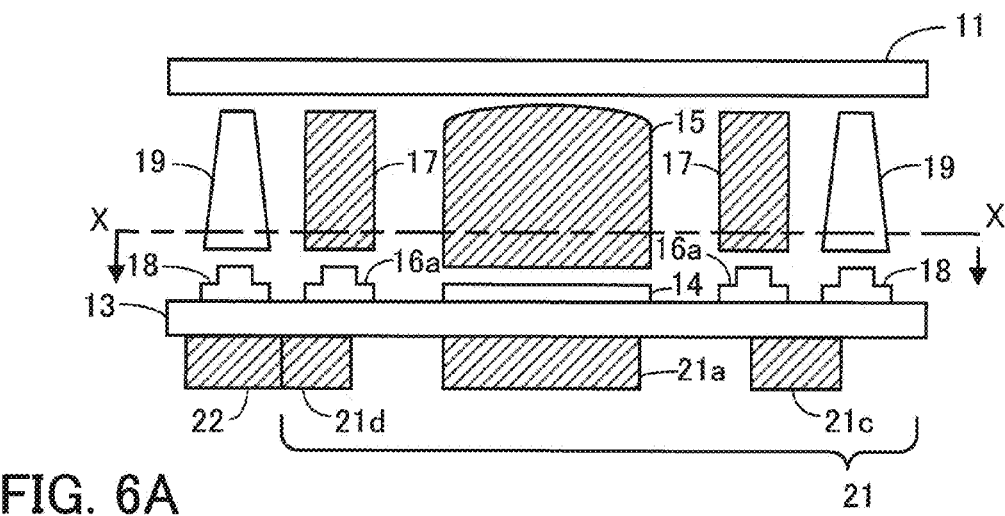
FIGS. 6A and 6B illustrate the internal configuration of the imaging apparatus according to the second embodiment.
Figure 6B:
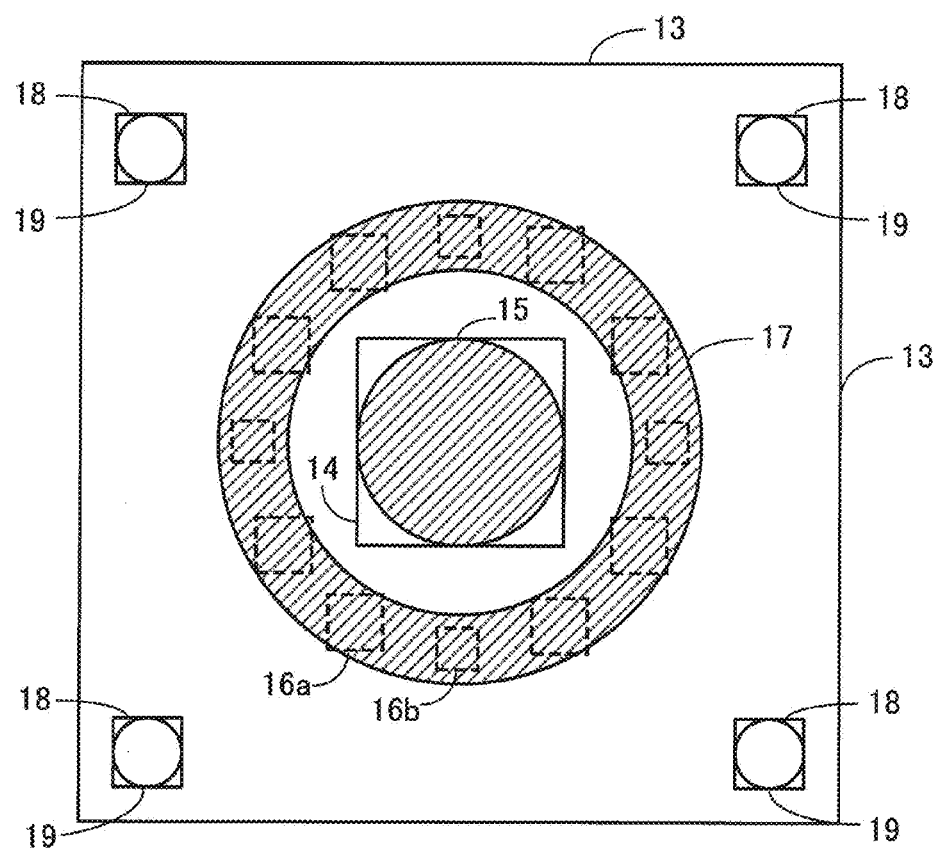

FIGS. 6A and 6B illustrate the internal configuration of the imaging apparatus according to the second embodiment.

More specifically, FIG. 6A is a side view of the imaging apparatus 10, and FIG. 6B is a top view of the imaging apparatus 10 taken along the one-dot chain line X-X of FIG. 6A.

The imaging apparatus 10 first includes an imaging camera 14, such as a complementary metal oxide semiconductor (CMOS) image sensor or the like, at the center of a camera circuit board 13. Further, an optical unit 15 including a lens optical system, such as a condenser lens or the like, is provided for the imaging camera 14. The imaging camera 14 is thus able to capture an image of the palm facing the filter 11.

On the camera circuit board 13, a plurality of light emitting elements 16a for emitting near infrared light, for example, and a plurality of light receiving elements 16b such as photodiodes are circularly arranged around the imaging camera 14. A ring-shaped light guide 17 is provided over the light emitting elements 16a and the light receiving elements 16b. The light guide 17 is made of resin, for example, and is configured to guide upward the light of the light emitting elements 16a arranged on the camera circuit board 13 so as to irradiate the object with uniform light.

Further, as illustrated in FIG. 6B, four light emitting elements 18 for distance measurement are arranged at four corners on the diagonal lines of the camera circuit board 13. The light emitting elements 18 are for measuring the distance from the imaging apparatus 10 to the palm. The light emitting elements 18 project spotlights onto the palm facing the filter 11. Thus, it is possible to measure the distance from the filter 11 to the object, that is, the palm, at four points, using the spotlights in the manner described in the first embodiment. Note that the light emitting elements 18 are arranged at the most distant points on the diagonal lines so as to be spaced apart from each other. If the distances measured using the spotlights projected from these four light emitting elements 18 are not equal to each other, a tilt of the palm is detected. Note that a beam irradiation mechanism 19 is attached to each light emitting element 18. The beam irradiation mechanism 19 causes the light to travel toward the palm by preventing diffusion of the light in other directions.

Further, the imaging apparatus 10 includes, on the back side of the camera circuit board 13, a circuit unit 21 electrically connected to the components on the camera circuit board 13, such as the imaging camera 14 and the like, and an external connector unit 22 electrically connected to the circuit unit 21.

The circuit unit 21 includes a central processing unit (CPU) 21a, a read only memory (ROM) (not illustrated), a random access memory (RAM) 21c, and an input and output interface 21d, and is electrically connected to the components on the camera circuit board 13 such as the imaging camera 14 and the like. The circuit unit 21 receives information on an image captured by the imaging camera 14, and performs image processing and the like on the captured image. Further, the circuit unit 21 performs measurement of the distance to the palm and the like, using the captured image received from the imaging camera 14.

The external connector unit 22 is electrically connected to a cable or the like that is connected to an external device through the external connection port 12a. The external connector unit 22 transmits the processing result of the circuit unit 21 to the external device, and receives signals from the external device.

The following describes the hardware configuration of the imaging camera 14, the light emitting elements 16a and 18, the light receiving elements 16b, the circuit unit 21, and the like of the imaging apparatus 10.

Figure 7:
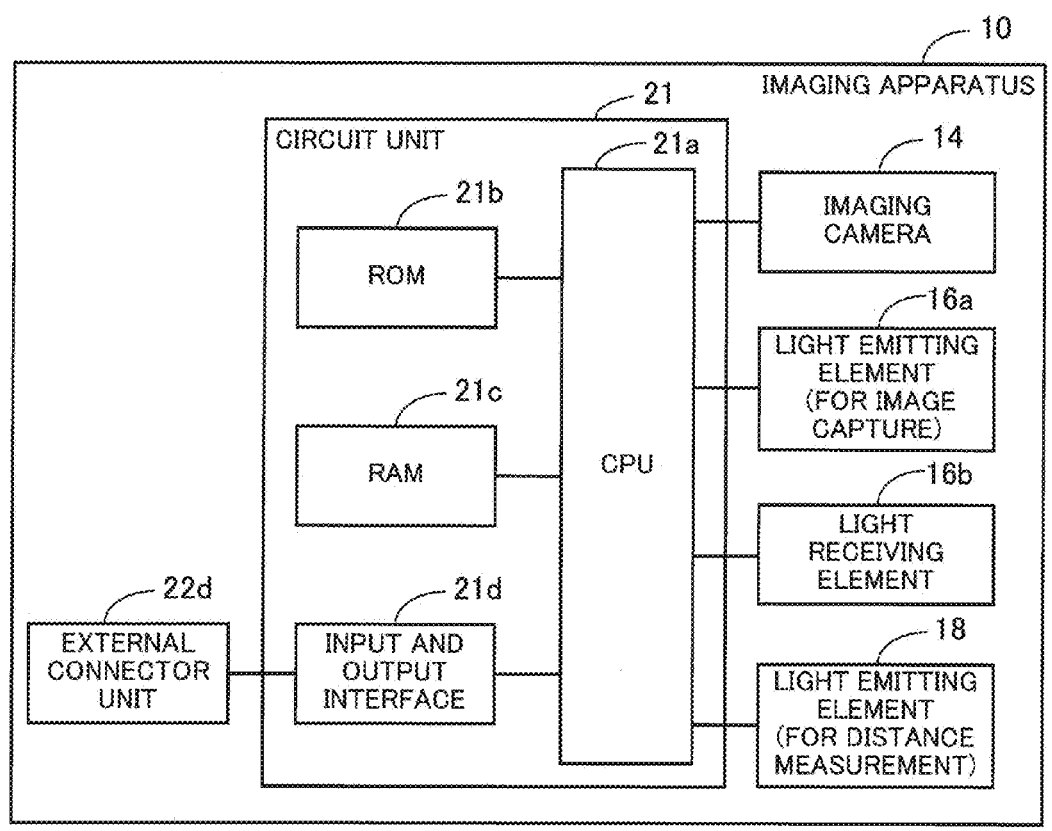
FIG. 7 illustrates an exemplary hardware configuration of the imaging apparatus according to the second embodiment.

FIG. 7 illustrates an exemplary hardware configuration of the imaging apparatus according to the second embodiment.

As illustrated in FIG. 7, the circuit unit 21 of the imaging apparatus 10 includes the CPU 21a, a ROM 21b, the RAM 21c, and the input and output interface 21d. The ROM 21b, the RAM 21c, the input and output interface 21d, the imaging camera 14, and the light emitting elements 16a, 18 and the light receiving elements 16b are connected to the CPU 21a.

The CPU 21a executes various programs stored in storage media, such as the ROM 21b and the like, and thereby controls the entire operation of the imaging apparatus 10.

The ROM 21b stores the operating system (OS) and application programs for the imaging apparatus 10.

The RAM 21c temporarily stores at least part of the OS and programs to be executed by the CPU 21a. The RAM 21c also stores various types of data that are needed for processing by the CPU 21a.

The input and output interface 21d is electrically connected to an external connector unit 22d. The input and output interface 21d transmits, to the CPU 21a, signals transmitted from the external device through the external connector unit 22b, and transmits, to the external device, signals transmitted from the CPU 21a.

The imaging apparatus 10 having the configuration described above captures an image of the palm with spotlight from each light emitting element 18 projected thereon, and detects the distance from the imaging apparatus 10 (the filter 11) to the palm on the basis of the distance between the spotlight in the captured image and the center of the captured image and on the basis of the imaging range of the imaging camera 14, in the manner described in the first embodiment, for example. More specifically, spotlights are projected from four locations onto the imaging apparatus 10, and thus the distance from the filter 11 to each of four points on the palm is detected. Note that an appropriate imaging distance for measuring the distance from the imaging apparatus 10 (filter 11) to the palm is in a range of 5 to 100 mm, and the most appropriate distance is in a range of about 35 to 75 mm. If the palm is placed in an inappropriate imaging range of 0 to 5 mm and in an inappropriate imaging range of 100 or greater, it is not possible to measure the distance to the palm, so that the measurement fails.

Next, the functions of the imaging apparatus 10 having the configuration described above will be described.

Figure 8:
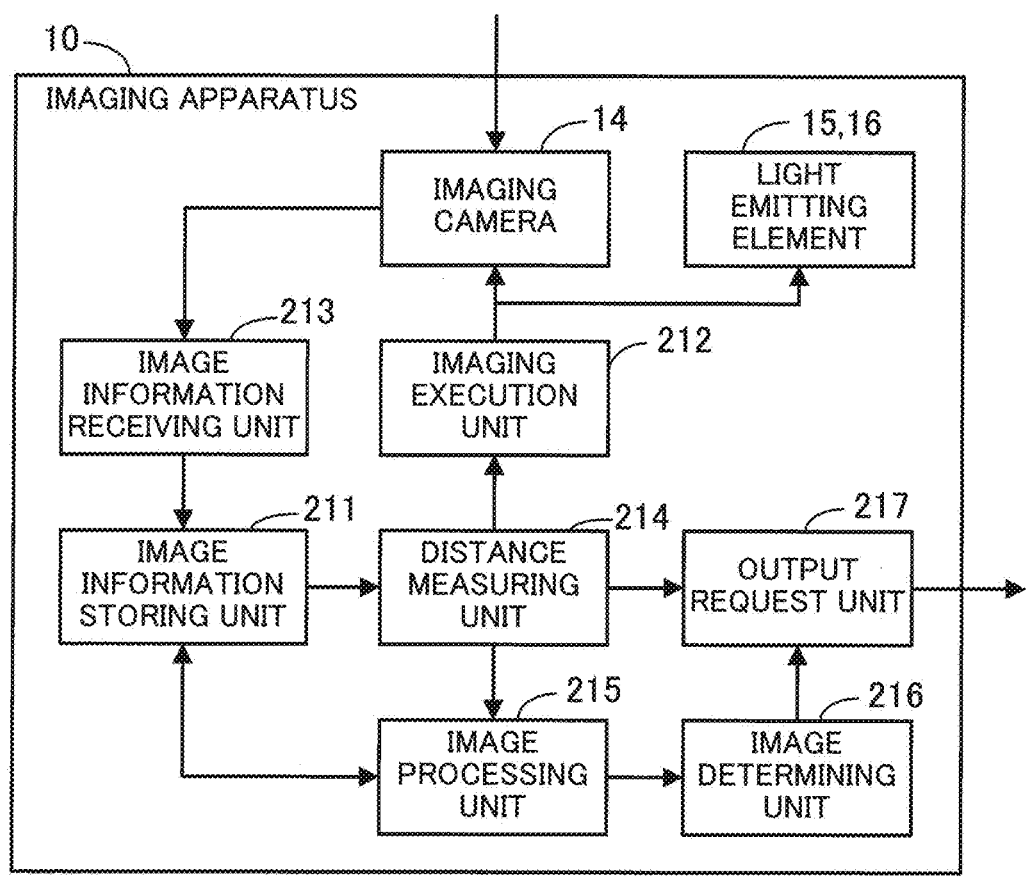
FIG. 8 is a functional block diagram of the imaging apparatus according to the second embodiment.

FIG. 8 is a functional block diagram of the imaging apparatus according to the second embodiment.

The imaging apparatus 10 measures the distance from the imaging apparatus 10 to the palm and, if the measurement fails, determines whether the palm is placed in a range of 0 to 5 mm from the imaging apparatus 10.

This imaging apparatus 10 includes an image information storing unit 211, an imaging execution unit 212, an image information receiving unit 213, a distance measuring unit 214, an image processing unit 215, an image determining unit 216, and an output request unit 217.

The image information storing unit 211 stores information, such as images captured by the imaging camera 14 and the like.

The imaging execution unit 212 causes the imaging camera 14 to capture an image with or without light from light emitting elements 15 and 16, depending on whether to measure the distance or to determine the proximity of the palm.

The image information receiving unit 213 receives captured image information from the imaging camera 14, and causes the image information storing unit 211 to store the captured image information.

The distance measuring unit 214 measures the distance from the imaging apparatus 10 to the palm in the manner described above, using the captured image stored in the image information storing unit 211 in which the spotlights projected from the four light emitting elements 18 appear. Further, the distance measuring unit 214 determines whether the palm is tilted on the basis of the four distances from the imaging apparatus 10 to the palm. For example, with the method described in the first embodiment, the distance measuring unit 214 determines that the palm is tilted when the four distances from the imaging apparatus 10 to the palm measured using the captured image in which the four spotlights appear are not equal to each other.

The image processing unit 215 detects differences between the images of the palm stored in the image information storing unit 211, which are captured with and without light from the light emitting element 15. Further, the image processing unit 215 binarizes a captured image representing the differences.

Note that the palm placed over the imaging apparatus 10 does not always cover the entire filter 11. There may be cases where the palm covers a part of the filter 11, and there may also be cases where the palm covering the filter 11 is tilted. In these cases, in the image of the palm that is captured by the imaging camera 14 with light emitted from the light emitting elements 16*a*, the area covering the filter 11 appears bright (white), and the area not covering the filter 11 also appears bright. Thus, the boundary between the region of the palm and the other regions becomes unclear. As a solution to this problem, differences between the images of the palm captured by the imaging camera 14 with and without light from the light emitting elements 16*a* are detected. Thus, the regions other than the palm region appear dark (black), so that the palm region and the other regions in the image become distinguishable from each other.

Further, since the spotlights are projected from four locations, the image processing unit 215 divides the captured image representing the differences into four blocks. Then, the image processing unit 215 binarizes each of the four blocks of the captured image so as to convert pixels having a predetermined brightness level (or luminance level) or higher into white pixels, and to convert pixels having a brightness level lower than the predetermined brightness level into black pixels. The image processing unit 215 causes the image information storing unit 211 to store the information resulting from these operations.

After a block of the captured image for which distance measurement failed is binarized by the image processing unit 215, the image determining unit 216 determines whether the number of white pixels (the area of the bright region) in the block accounts for a predetermined percentage of the area of the selected block of the captured image. If the bright region is determined to account for a predetermined percentage, the image determining unit 216 determines that the palm depicted in the block of the captured image for which distance measurement failed is placed in a range of 0 to 5 mm from the imaging apparatus 10.

Note that if the bright region of any of the four blocks of the captured image accounts for a predetermined percentage, the filter 11 of the imaging apparatus 10 may be covered with a part of the palm. Accordingly, in this case, the palm is determined to be placed in a range of 0 to 5 mm from the imaging apparatus 10.

The output request unit 217 outputs the measurement result and the determination result obtained by the distance measuring unit 214 and the image determining unit 216 to the external device.

Next, a description will be given of an operation of determining the proximity of the palm performed by the imaging apparatus 10 having these functions.

Figure 9:
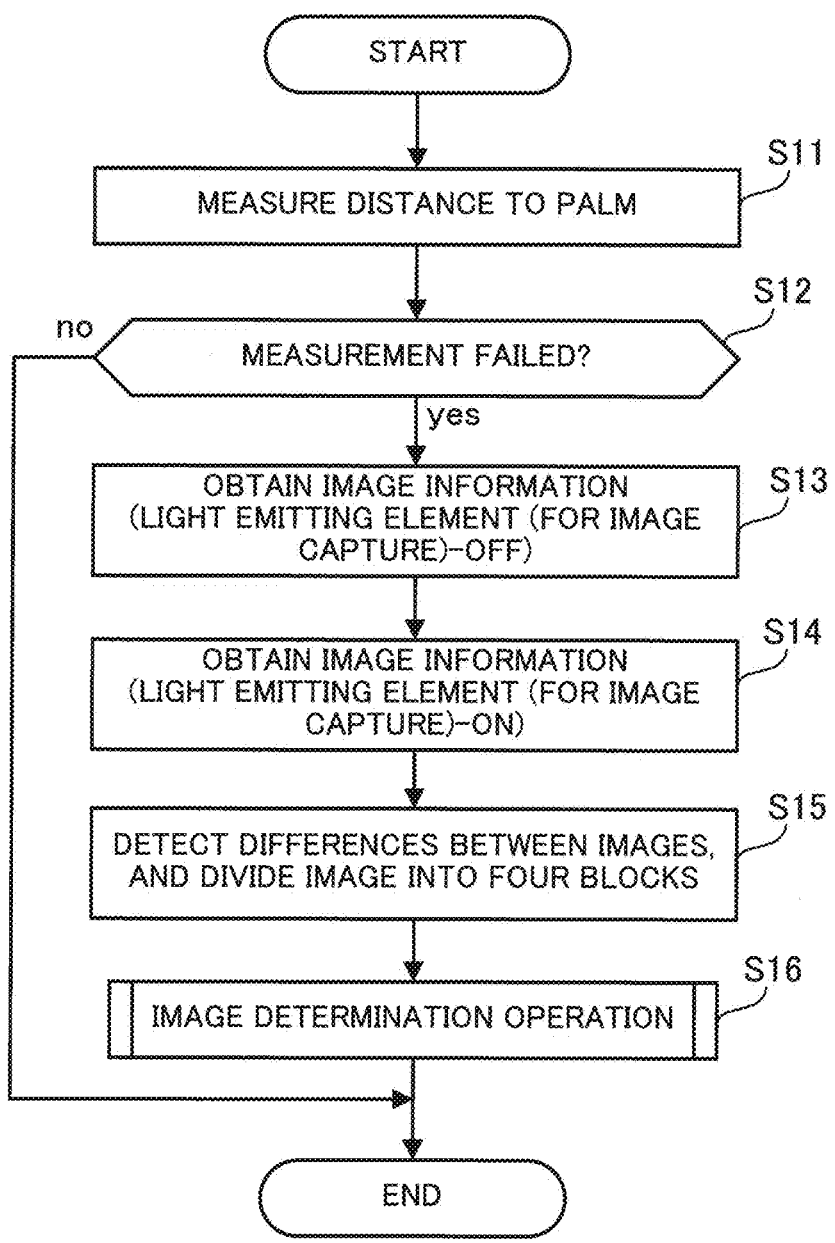
FIG. 9 is a flowchart illustrating the procedure of proximity determination performed by the imaging apparatus according to the second embodiment.

FIG. 9 is a flowchart illustrating the procedure of proximity determination performed by the imaging apparatus according to the second embodiment.

(Step S11) The imaging execution unit 212 causes the four light emitting elements 18 for distance measurement to project light onto the palm, and causes the imaging camera 14 to capture an image of the palm with the spotlights projected thereon.

The image information receiving unit 213 receives, from the imaging camera 14, information on the image captured in which the spotlights appear, and causes the image information storing unit 211 to store the information.

The distance measuring unit 214 measures the distance from the imaging apparatus 10 to the palm, on the basis of the spotlights in the captured image.

(Step S12) On the basis of the results of the measurement of the distance to the palm, the distance measuring unit 214 determines whether the measurement of distance from the imaging apparatus 10 to each of four points in the respective blocks has failed. If the measurement has failed at any of the points, the process proceeds to step S13. If the measurement has succeeded at all the points, the measurement of the distance to the palm is completed. Thus, the proximity determination process ends.

(Step S13) When an imaging execution request is received from the distance measuring unit 214, the imaging execution unit 212 causes the imaging camera 14 to capture an image of the palm without light from the light emitting elements 16*a*.

The image information receiving unit 213 receives, from the imaging camera 14, information on the image captured without light, and causes the image information storing unit 211 to store the information.

(Step S14) When an imaging execution request is received from the distance measuring unit 214, the imaging execution unit 212 causes the imaging camera 14 to capture an image of the palm with light emitted from the light emitting elements 16*a*.

The image information receiving unit 213 receives, from the imaging camera 14, information on the image captured with light, and causes the image information storing unit 211 to store the information.

Note that the order in which steps S13 and S14 are performed may be reversed.

(Step S15) The image processing unit 215 detects differences between the images of the palm stored in the image information storing unit 211, which are captured with and without light from the light emitting element 16*a*. Further, the image processing unit 215 divides a captured image representing the differences into four equal-sized blocks.

(Step S16) The image determining unit 216 receives from the image processing unit 215 the four blocks of the captured image representing the differences, and determines, for each of the blocks, whether the palm is placed in a range of 0 to 5 mm from the imaging apparatus 10.

If, in step S16, the palm is determined not to be placed in a range of 0 to 5 mm, the palm is determined to be spaced apart from the imaging apparatus 10 by 100 mm or greater, or is determined not to be placed over the imaging apparatus 10.

The following describes the operation of step S16 in greater detail.

Figure 10:
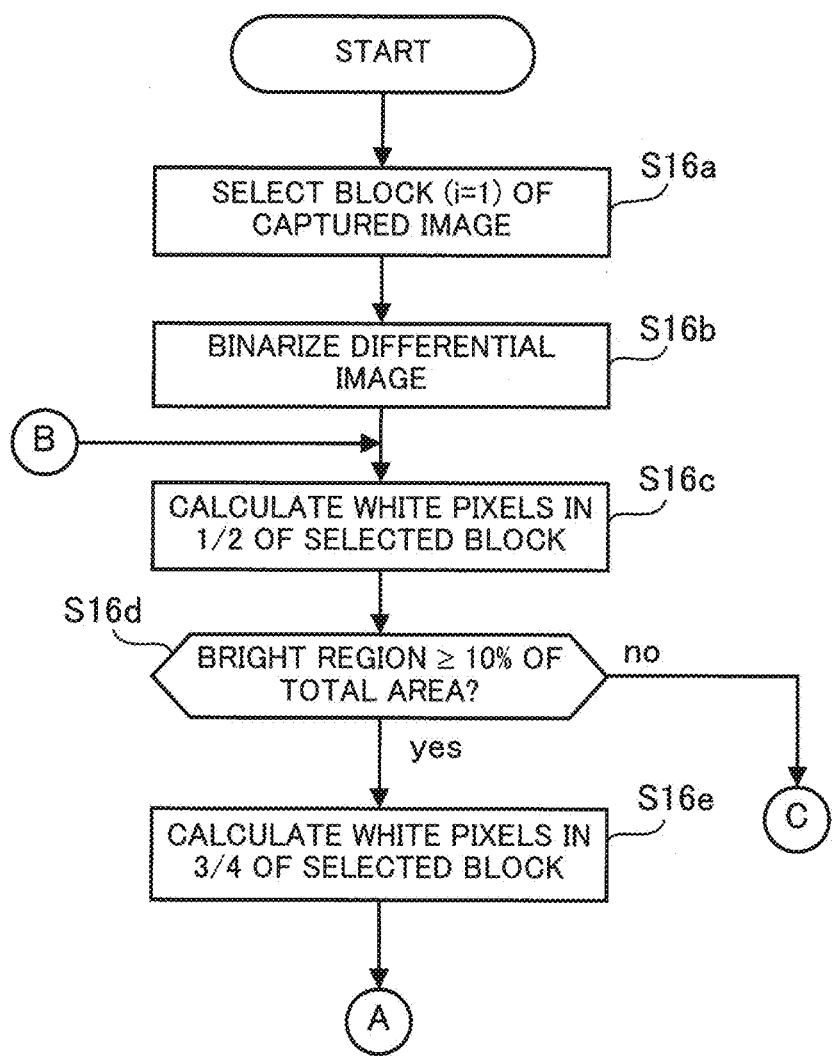
FIG. 10 is a flowchart (part 1) illustrating the procedure of pixel determination for a captured image performed by the imaging apparatus according to the second embodiment.
Figure 11:
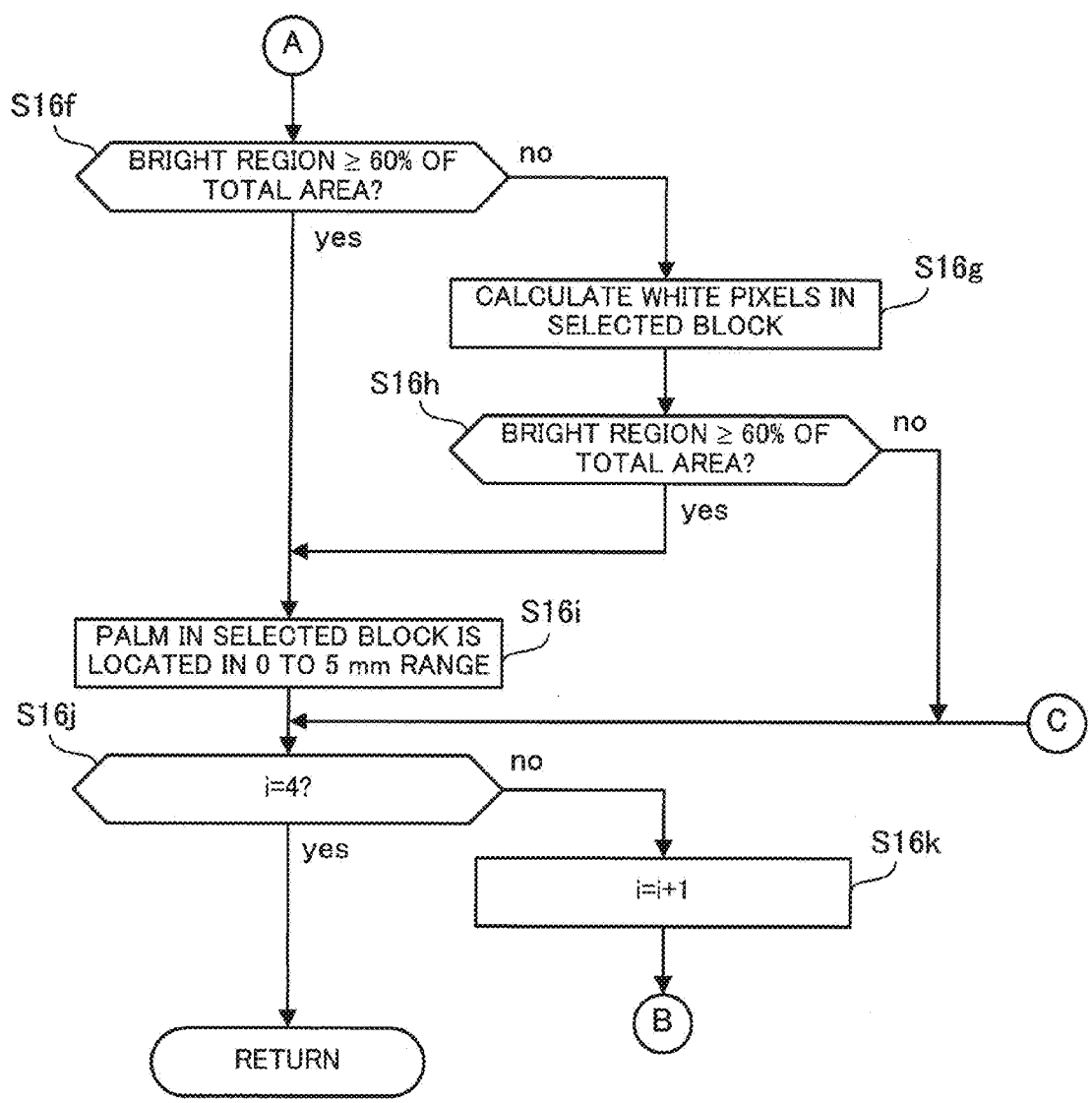
FIG. 11 is a flowchart (part 2) illustrating the procedure of pixel determination for a captured image performed by the imaging apparatus according to the second embodiment.

FIGS. 10 and 11 are flowcharts illustrating the procedure of pixel determination for a captured image performed by the imaging apparatus according to the second embodiment.

(Step S16a) The image processing unit 215 selects one block (i=1) out of the four blocks (which are assigned numbers i=1 through 4) into which the captured image representing the differences is divided in step S15.

(Step S16b) After the block is selected in Step S16a from the four blocks of the captured image representing the differences which is stored in the image information storing unit 211, the image processing unit 215 first binarizes the selected block. In this binarization process, pixels having a brightness level of 69 or higher in 256 brightness levels are converted into white pixels, and pixels having a brightness level of 68 or lower are converted into black pixels.

(Step S16c) The image processing unit 215 calculates the number of white pixels (the area of the bright region) in the area of half the selected block of the captured image that is binarized in step S16b.

(Step S16d) The image determining unit 216 determines whether the area of the bright region calculated by the image processing unit 215 in step S16c is 10% or greater of the total area of the selected one of the four blocks of the captured image.

If the bright region is 10% or greater of the total area of the selected block of the captured image, the process proceeds to step S16e. If the bright region is less than 10%, the process proceeds to step S16j.

(Step S16e) The image processing unit 215 calculates the number of white pixels (the area of the bright region) in the area of three-quarters of the selected block of the captured image.

(Step S16f) The image determining unit 216 determines whether the area of the bright region calculated by the image processing unit 215 in step S16e is 60% or greater of the total area of the selected one of the four blocks of the captured image.

If the bright region is 60% or greater of the total area of the selected block of the captured image, the process proceeds to step S16i. If the bright region is less than 60%, the process proceeds to step S16g.

(Step S16g) The image processing unit 215 calculates the number of white pixels (the area of the bright region) in the total area of the selected block of the captured image.

(Step S16h) The image determining unit 216 determines whether the area of the bright region calculated by the image processing unit 215 in step S16g is 60% or greater of the total area of the selected one of the four blocks of the captured image.

If the bright region is 60% or greater of the total area of the selected block of the captured image, the process proceeds to step S16i. If the bright region is less than 60%, the process proceeds to step S16j.

(Step S16i) The image determining unit 216 determines that a portion of the palm depicted in the selected block of the captured image is located in a range of 0 to 5 mm from the imaging apparatus 10.

(Step S16j) The image determining unit 216 determines whether the selected block of the captured image is i=4.

If the number assigned to the selected block of the captured image is i=4, the above process ends. If the number assigned to the selected block of the captured image is not i=4, the process proceeds to step S16k.

(Step S16k) The image processing unit 215 selects a block of the next number (i+1) that is not yet selected, from the four blocks into which the captured image is divided in step S15. Then the process returns to step S16c.

Note that in the flowcharts of FIGS. 10 and 11, the threshold of the brightness level (luminance level) for binarization of the captured image is set to 69 in 256 brightness levels. However, the user may set the threshold to a desired level. Further, the threshold of the area of the bright region for reliably determining whether the palm is placed in a range of 0 to 5 mm from the imaging apparatus 10 is preferably set to 50% or greater. In the flowcharts of FIGS. 10 and 11, the threshold is set to 60% or greater. In this case, when the bright region in the area of half the selected block is less than 10% in steps S16c and 16d, even if the other half is a bright region, the threshold of 60% is not satisfied. Accordingly, with steps S16c and S16d, blocks of the captured image containing a bright region that does not satisfy the threshold are removed from the determination at an early stage, so that the processing load in FIGS. 10 and 11 may be reduced.

Next, an example of use of the imaging apparatus 10 will be described.

Example

This example describes the case where the imaging apparatus 10 is used for user authentication for logging into an information processing apparatus, such as a personal computer or the like.

Figure 12:
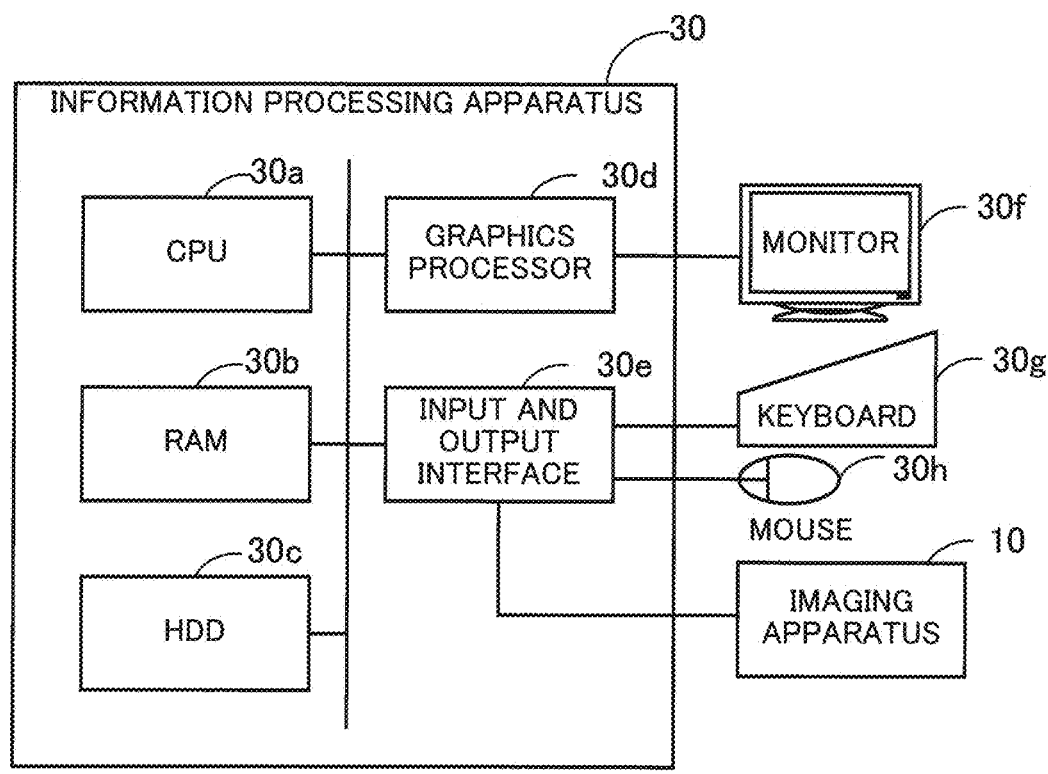
FIG. 12 illustrates an exemplary hardware configuration of an information processing apparatus with the imaging apparatus connected thereto according to the second embodiment.

FIG. 12 illustrates an exemplary hardware configuration of an information processing apparatus with the imaging apparatus connected thereto according to the second embodiment.

An information processing apparatus 30 may be a personal computer, for example, and includes a CPU 30a, a RAM 30b, a hard disk drive (HDD) 30c, a graphics processor 30d, and an input and output interface 30e.

The CPU 30a executes various programs stored in storage media, such as the HDD 30c and the like, and thereby controls the entire operation of the information processing apparatus 30.

The RAM 30b temporarily stores at least part of the OS and programs to be executed by the CPU 30a. The RAM 30b also stores various types of data that are needed for processing by the CPU 30a.

The HDD 30c stores the OS and application programs for the information processing apparatus 30. The HDD 30c also stores various types of data that are needed for processing by the CPU 30a.

The graphics processor 30d may be a video card or a graphics board, for example, and transmits image data to a monitor 30f for displaying images, in accordance with an instruction from the CPU 30a.

A keyboard 30g and a mouse 30h are connected to the input and output interface 30e. The input and output interface 30e receives signals from the keyboard 30g and the mouse 30h, and outputs the received signals to the CPU 30a.

Further, the imaging apparatus 10 described above is connected to the input and output interface 30e.

The imaging apparatus 10 is electrically connected at the external connection port 12a to the input and output interface 30e of the information processing apparatus 30 with a universal serial bus (USB) cable.

In the information processing apparatus 30 having the configuration described above, palm vein patterns of the users are stored in advance in association with their login passwords. Upon reception of a palm vein pattern of the user read by the imaging apparatus 10, the information processing apparatus 30 verifies the read vein pattern against a vein pattern associated with their login password. If a match is confirmed, login is completed.

The following describes logging in using the imaging apparatus 10 connected to the information processing apparatus 30.

When the information processing apparatus 30 is powered on, the imaging apparatus 10 first causes the output request unit 217 to transmit to the information processing apparatus 30 an output request for displaying on the monitor 30f a message "Please place your palm close to the filter 11 of the imaging apparatus 10".

In response to the displayed message, the user places his/her palm close to the filter 11 of the imaging apparatus 10. It is supposed herein that the user places his/her palm in a distance range of 0 to 5 mm from the filter 11 of the imaging apparatus 10.

Then, the distance measuring unit 214 measures the distance to the palm using light emitted from the light emitting elements 18 for distance measurement. However, the measurement fails on at least one of the four points on the palm. Thus, the imaging execution unit 212 causes the imaging camera 14 to capture images of the palm with and without light from the light emitting element 16a (steps S11 through S14).

Then, the image processing unit 215 detects differences between the images captured with and without light from the light emitting elements 16a, and divides the captured image representing the differences into four blocks (step S15).

The image determining unit 216 selects one of the four blocks of the captured image representing the differences, and binarizes the selected block. Then, the number of white pixels (the area of the bright region) in the binarized block of the captured image is calculated. The image determining unit 216 determines that the area of the bright region is 60% or greater of the total area of the selected one of the four blocks of the captured image, and thus determines that a portion of the palm depicted in the selected block of the captured image is located in a range of 0 to 5 mm from the filter 11 of the imaging apparatus 10 (steps S16a through S16f, and S16i).

The imaging apparatus 10 performs the same process as the above for the other three of the four blocks of the captured image in the manner described above, and determines which block depicts a portion of the palm located in a range of 0 to 5 mm from the filter 11 of the imaging apparatus 10.

The output request unit 217 transmits to the information processing apparatus 30 an output request for displaying on the monitor 30f a message "Please move your palm away from the imaging apparatus 10".

In response to the message displayed by the information processing apparatus 30, the user moves the palm away from the imaging apparatus 10. While the palm is moved, the distance measuring unit 214 measures the distance to the palm using light emitted from the light emitting elements 18 for distance measurement. When the distance measuring unit 214 detects that the palm of the hand of the user has entered an appropriate distance range (35 through 75 mm) from the imaging apparatus 10, the output request unit 217 transmits to the information processing apparatus 30 an output request for displaying on the monitor 30f a message "Please do not move your palm".

When the distance measuring unit 214 detects that the palm of the hand of the user is stopped in an appropriate distance range from the imaging apparatus 10 and that the palm is horizontal to the filter 11 of the imaging apparatus 10 on the basis of the distances to the four points on the palm, the imaging apparatus 10 reads the palm vein pattern of the user, and transmits information of the read vein pattern to the information processing apparatus 30. In the case where the distance measuring unit 214 detects that the palm is not horizontal to the filter 11, the output request unit 217 transmits to the information processing apparatus 30 an output request for displaying on the monitor 30f a message "Please hold your palm horizontal to the filter 11".

The information processing apparatus 30 verifies the information on the vein pattern transmitted from the imaging apparatus 10 against a vein pattern that is stored in advance in association with their login password. If the vein patterns match, login to the information processing apparatus 30 is completed.

Note that, in the same manner as described above, in the case where the measurement fails on at least one of the four points on the palm, if the image determining unit 216 determines that the palm is not placed in a range of 0 to 5 mm from the imaging apparatus 10 by performing the operations of steps S16a through S16k, the output request unit 217 transmits to the information processing apparatus 30 an output request for displaying on the monitor 30f a message "Please place your palm close to the imaging apparatus 10, or place your palm over the imaging apparatus 10". Then, the distance measuring unit 214 measures again the distance to the palm using light emitted from the light emitting elements 18 for distance measurement, and thus the above process is performed.

In this way, in the case where the imaging apparatus 10 is not able to detect the distance to the palm placed over the filter 11, the imaging apparatus 10 causes the imaging camera 14 to capture images with and without light from the light emitting elements 16a, and detects differences between the captured images. Then, if the area of the bright region in the captured image of the palm is equal to or greater than a predetermined area of the captured image, the palm is determined to be placed in an inappropriate distance range from the imaging apparatus 10. If the area of the bright region is less than a predetermined area, the palm is determined not to be placed over the imaging apparatus 10 or is determined to be spaced apart by a distance greater than an appropriate imaging distance.

Accordingly, since such determination is made, it is possible to prompt the user to place his/her palm closer to the imaging apparatus 10 or to move his/her palm away from the imaging apparatus 10 if the palm is placed in an inappropriate imaging distance range from the imaging apparatus 10. Thus, it becomes possible to smoothly capture an image of the palm.

The above-described processing functions may be implemented on a computer. In this case, a program describing the functions of the imaging apparatus 1 or 10 is provided. When the program is executed by a computer, the above-described processing functions are implemented on the computer. The program describing the functions may be stored in a computer-readable recording medium. Examples of computer-readable recording media include magnetic storage devices, optical discs, magneto-optical storage media, semiconductor memory devices, and the like. Examples of magnetic storage devices include hard disk drive (HDD), flexible disk (FD), magnetic tapes, and the like. Examples of optical discs include digital versatile disc (DVD), DVD-RAM, compact disc read only memory (CD-ROM), compact disc rewritable (CD-RW), and the like. Examples of magneto-optical storage media include magneto-optical disk (MO) and the like.

In the case of distributing the program, portable storage media, such as DVD, CD-ROM, and the like, storing the program therein may be sold. Further, the program may be stored in a storage device of a server computer so as to be transmitted from the server computer to other computers via a network.

For executing the program, the computer stores the program recorded on the portable storage medium or the program transmitted from the server computer in its storage device. Then, the computer reads the program from its storage device, and executes processing in accordance with the program. Note that the computer may read the program directly from the portable storage medium so as to execute processing in accordance with the program. Alternatively, the computer may sequentially receive the program from a server computer connected over a network, and perform processing in accordance with the received program.

The above-described processing functions may also be implemented wholly or partly by using electronic circuit such as digital signal processor (DSP), application-specific integrated circuit (ASIC), programmable logic device (PLD), and the like.

According to the above-described imaging apparatus, imaging method, and imaging program, it is possible to determine that the object is close to an imaging unit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An imaging apparatus comprising:
   an imaging unit configured to capture an image of an object;
   four first light emitting units configured to, when measuring four distances to the object, emit light so as to illuminate a front of the object to be imaged by the imaging unit, the four first light emitting units being respectively provided at four corners of a square on a planar view;
   a second light emitting unit configured to, when capturing an image of the object, emit light so as to illuminate the front of the object to be imaged by the imaging unit; and
   a processor configured to perform a procedure including:
   measuring the four distances to the front of the object based on a first image captured by the imaging unit with light from the four first light emitting units,
   determining based on the four distances respectively measured with respect to the four first light emitting units whether the object is horizontal to the imaging unit or not,
   determining whether the object is close to the imaging unit or the object is not placed over the imaging unit, on the basis of a bright region in a second image of the object that is captured by the imaging unit with light from the second light emitting unit, when four spotlights from the four first light emitting units do not appear in the first image, and
   in response to failing to measure the four distances to the object based on the first image due to an actual distance from the imaging unit to the object,
   making, when determining that the object is not horizontal to the imaging unit, a notification requesting a change of a tilt of the object with respect to the imaging unit,
   making, when determining that the object is close to the imaging unit, a notification requesting a movement of a position of the object away from the imaging unit, and
   making, when determining that the object is not placed over the imaging unit, a notification requesting a movement of the position of the object closer to the imaging unit.

2. The imaging apparatus according to claim 1, wherein the determining includes determining whether the object is close to the imaging unit or the object is not placed over the imaging unit, on the basis of a bright region in a differential image representing differences between a third image of the object that is captured by the imaging unit without light from the second light emitting unit and the second image that is captured with light therefrom.

3. The imaging apparatus according to claim 2, wherein:
   the procedure further includes binarizing the differential image; and
   the determining includes determining whether the object is close to the imaging unit or not, on the basis of a percentage of a bright region represented by white pixels in the differential image that is binarized in the binarizing, with respect to an area of the differential image.

4. The imaging apparatus according to claim 3, wherein the determining includes determining whether the object is close to the imaging unit or not, on the basis of a percentage of a bright region represented by white pixels in any one of four equal-sized blocks into which the binarized differential image is divided, with respect to an area of the block of the differential image.

5. An imaging method comprising:
   measuring, by a processor, four distances to an object based on a first image captured by an imaging unit by causing four first light emitting units to emit light so as to illuminate a front of the object, the four first light emitting units being respectively provided at four corners of a square on a planar view;
   determining, by the processor, based on the four distances respectively measured with respect to the four first light emitting units whether the object is horizontal to the imaging unit or not;
   when four spotlights from the four first light emitting units do not appear in the first image, determining, by the processor, whether the object is close to the imaging unit or the object is not placed over the imaging unit, on the basis of a bright region in a second image of the object that is captured by causing a second light emitting unit so as to illuminate the front of the object; and
   in response to failing to measure the four distances to the object based on the first image due to an actual distance from the imaging unit to the object,
   when determining that the object is not horizontal to the imaging unit, making, by the processor, a notification requesting a change of a tilt of the object with respect to the imaging unit,
   when determining that the object is close to the imaging unit, making a notification requesting a movement of a position of the object away from the imaging unit, and when determining that the object is not placed over the imaging unit, making a notification requesting a movement of the position of the object closer to the imaging unit.

6. A non-transitory computer-readable storage medium storing a computer program, the computer program causing a computer to perform a procedure comprising:

measuring four distances to an object based on a first image captured by an imaging unit by causing four first light emitting units to emit light so as to illuminate a side front of the object, the four first light emitting units being respectively provided at four corners of a square on a planar view;

determining based on the four distances respectively measured with respect to the four first light emitting units whether the object is horizontal to the imaging unit or not;

when four spotlights from the four first light emitting units do not appear in the first image, determining whether the object is close to the imaging unit or net the object is not placed over the imaging unit on the basis of a bright region in a second image of the object that is captured by causing a second light emitting unit so as to illuminate the side of the object: and in response to failing to measure the four distances to the object based on the first image due to an actual distance from the imaging unit to the object, when determining that the object is not horizontal to the imaging unit, making a notification requesting a change of a tilt of the object with respect to the imaging unit;

when determining that the object is close to the imaging unit, making a notification requesting a movement of a position of the object from the imaging unit, and when determining that the object is not placed over the imaging unit, making a notification requesting a movement of the position of the object closer to the imaging unit.

* * * * *